United States Patent [19]

Allison et al.

[11] Patent Number: 4,888,687

[45] Date of Patent: Dec. 19, 1989

[54] MEMORY CONTROL SYSTEM

[75] Inventors: Robert Allison, Medfield; Brian Lefsky, West Newton, both of Mass.

[73] Assignee: Prime Computer, Inc., Natick, Mass.

[21] Appl. No.: 46,456

[22] Filed: May 4, 1987

[51] Int. Cl.[4] .................. G06F 12/06; G06F 13/00
[52] U.S. Cl. .................. 364/200; 364/254.4; 364/254.9
[58] Field of Search ... 364/200 MS File, 900 MS File

[56] References Cited

U.S. PATENT DOCUMENTS

| 4,234,934 | 11/1980 | Thorsrud | 364/900 |
| 4,545,010 | 10/1985 | Salas et al. | 364/200 |
| 4,654,787 | 3/1987 | Finnell et al. | 364/200 |
| 4,675,808 | 6/1987 | Grinn et al. | 364/200 |
| 4,682,283 | 7/1987 | Robb | 364/200 |
| 4,740,916 | 4/1988 | Martin | 364/900 |
| 4,760,522 | 7/1988 | Weatherford et al. | 364/200 |

Primary Examiner—Eddie P. Chan
Attorney, Agent, or Firm—Wolf, Greenfield & Sacks

[57] ABSTRACT

A system for controlling the addressing of a memory on a predetermined multi-megabyte decode boundary. An address shifter is coupled between CPU address lines and backplane area bussed address lines. The address shifter is controlled in accordance with the control signal determined by the memory array of largest capacity of all memory arrays. The control signal has different states to control the address shifter to couple different address bit patterns therethrough to the backplane area address bus as a function of the selected control signal state.

32 Claims, 5 Drawing Sheets

| (a) 4MB DECODE | (b) 8MB DECODE | (c) 16MB DECODE | BUSSED ADDRESS LINE NO. |
|---|---|---|---|
| A26 | 0 | 0 | BAL 27 |
| A25 | A26 | A23 | 26 |
| A24 | A25 | A26 | 25 |
| A23 | A24 | A25 | 24 |
| A22 | A23 | A24 | 23 |
| 0 | A22 | A22 | 22 |
| A21 | A21 | A21 | 21 |
| | | | BAL 20 |
| | | | . |
| | | | . |
| | | | . |
| | | | BAL 3 |
| | | | BAL 2 |
| | | | : |
| | | | BAL 0 |

FIG. 5

MEMORY CONTROL SYSTEM

BACKGROUND OF THE INVENTION

1. Field of the Invention

The present invention relates in general to a memory control system, and pertains, more particularly, to an improved system for memory addressing in a memory that is adapted to receive different capacity memory boards or memory arrays. Even more particularly, the invention pertains to an improved memory control system operating on the basis of dynamic memory array configurability.

2. Background Discussion

Generally speaking, in computer memory systems the address ranges of multiple memory arrays in a backplane are set employing relatively complicated schemes that require attention each time that the memory array is changed to replace it with a different capacity memory. Existing memory systems do not easily accommodate the substitution of different capacity memory boards. With the existing systems if different sized arrays are to be used in the same backplane typically there are a number of special rules that must be followed so that operation is carried out properly. Even when these rules are used to provide workable configurations of memory arrays, "holes" sometimes occur in the logical memory address space. These holes put an extra burden on the operating system in that it has to take extra memory space and time to keep track of missing memory pages.

Accordingly, it is an object of the present invention to provide a dynamic memory array configuration system that allows multiple memory array sizes to reside at the same memory backplane area and with a minimum of rules for configuration.

Another object of the present invention is to provide an improved memory control system as in accordance with the preceding object and in which there is a minimizing of the number of holes in the address space.

A further object of the present invention is to provide an improved memory control system for memory array configurability and that employs software control to set-up the decoding of the memory arrays without requiring operator assistance.

Still another object of the present invention is to provide a memory control system as in accordance with all of the preceding objects and in which the system can be implemented very easily, requires minimal initial operator set-up, and that is readily modifiable to accommodate various changes in memory array (board) capacity.

SUMMARY OF THE INVENTION

To accomplish the foregoing and other objects, features and advantages of the invention there is provided an improved system and associated method for memory control. The system and method of the present invention allows multiple memory array sizes to be accommodated at the same memory backplane area. The technique of the invention allows the computer software (or the like hardware) to find the size of the largest memory array in the system and then set the decode based thereon by shifting the higher order address bits that are used for decoding of banks or arrays of memory. Based upon the particular multi-megabyte decode, in accordance with the embodiment disclosed herein, the larger the capacity of the largest capacity memory, the higher the decode is set and thus the higher the shift to higher order address bits. The significance of the address bits is changed or shifted allowing each memory array or board in the memory backplane to decode on, for example, 4, 8, 16, or 32 megabyte (MB) boundaries.

In accordance with one aspect of the present invention there is provided a memory control system for controlling memory address signals coupling between an input address bus as may couple from a central processing unit and memory means that may be comprised of a plurality of memory arrays each including multiple array banks. The memory means is addressed through a memory backplane area having a plurality of connectors corresponding to the plurality of memory arrays. The memory arrays may be of different storage capacity such as, for example, 4 MB or 8 MB. The aforementioned shifting of the higher order address bits is carried out in accordance with the invention by address shifter means that may be comprised of a multiplexer means having a plurality of stages with each stage having multiple address inputs and an address output. The multiplexer means further has a control input for controlling the coupling of address signals therethrough. Means are provided for establishing a control signal determined by the memory array of largest capacity of all memory arrays. This control signal may be established by means of one or more jumpers or other types of selection means at the memory backplane. In accordance with this control signal, the multiplexer means is controlled so as to present different input address bus signals to the backplane area shifted in accordance with the memory array capacity control signal. The control signal to the multiplexer means, for example, may decode on an eight megabyte boundry when using both 4 or 8 MB arrays. The control signal causes a shift in address signals by at least one address position when changing control from a four megabyte decode to an eight megabyte decode.

In accordance with further features of the system, the backplane address bus has, in one embodiment of the invention, at least one address location for bank decode and preferably three address locations for array decode. Each memory bank has multiple locations mapped into a plurality of words each of several bytes. The backplane address bus also includes address locations for word decode and address locations for byte decode. The multiplexer means may be controlled from the control signal in which the control signal may be a binary signal that in the disclosed embodiment is in the form of two control bits for providing up to four different address selections by the multiplexer means. These four selections may correspond to, for example, 4, 8, 16, and 32 MB boundries.

In accordance with still further features of the invention there is provided a comparator means associated with each memory array and having first and second address inputs to be compared. Associated with the comparator means is a means at the backplane area defining a predetermined array code for identifying each particular memory array. The array code is coupled to the first address inputs of the comparator means and the backplane area address signals are coupled to the second address inputs of the comparator means. The comparator means provides an output array select signal upon equal comparison. There is furthermore included a bank decoder for receiving at least one backplane area address signal to provide an output bank select signal. The bank decoder has a capability of decoding two backplane area address signals. Also associated with the memory array is a coupling means that may be in the form of jumper means having one position for coupling a predetermined address signal to the bank decoder and another position for coupling the predetermined address signal to the comparator means.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

The addressing scheme of the present invention, in the embodiment to now be described, relies upon a shift of addresses based upon the size of the largest capacity memory of all the memory arrays. The decode is set based upon the size of the largest capacity array. The decode is changed by changing the significance of the address lines sent to the backplane area through a shifter.

Figure 1:
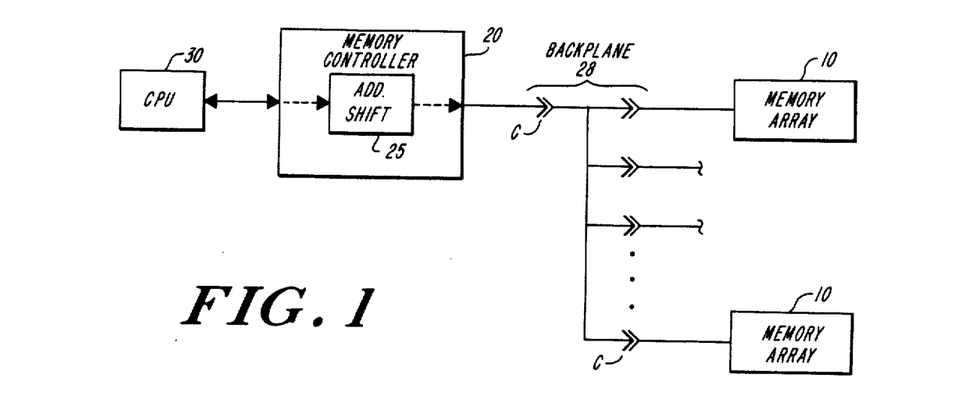
FIG. 1 is a general block diagram illustrating the memory system and associated control.

Now, refer to FIG. 1 for an illustration of the general system including a plurality of memory arrays 10, a memory controller 20, and also illustrated in FIG. 1, a central processing unit 30. As noted in FIG. 1, in the memory controller 20 is schematically illustrated the address shifter 25. The address shifter 25 shifts the addresses presented from the CPU 30 to the backplane area 28 in accordance with a control signal as will all be described in further detail hereinafter. The control signal is established by determination of the largest capacity memory array.

FIG. 1 also illustrates connectors at C such as between the backplane area 28 and the memory controller 20 as well as connectors at the backplane area 28 into which the memory arrays 10 respectively connect. The memory arrays 10 are typically referred to as memory boards and are furthermore referred to as being accommodated in memory slots in which the boards plug into connectors at the backplane area 28.

Figure 2A:
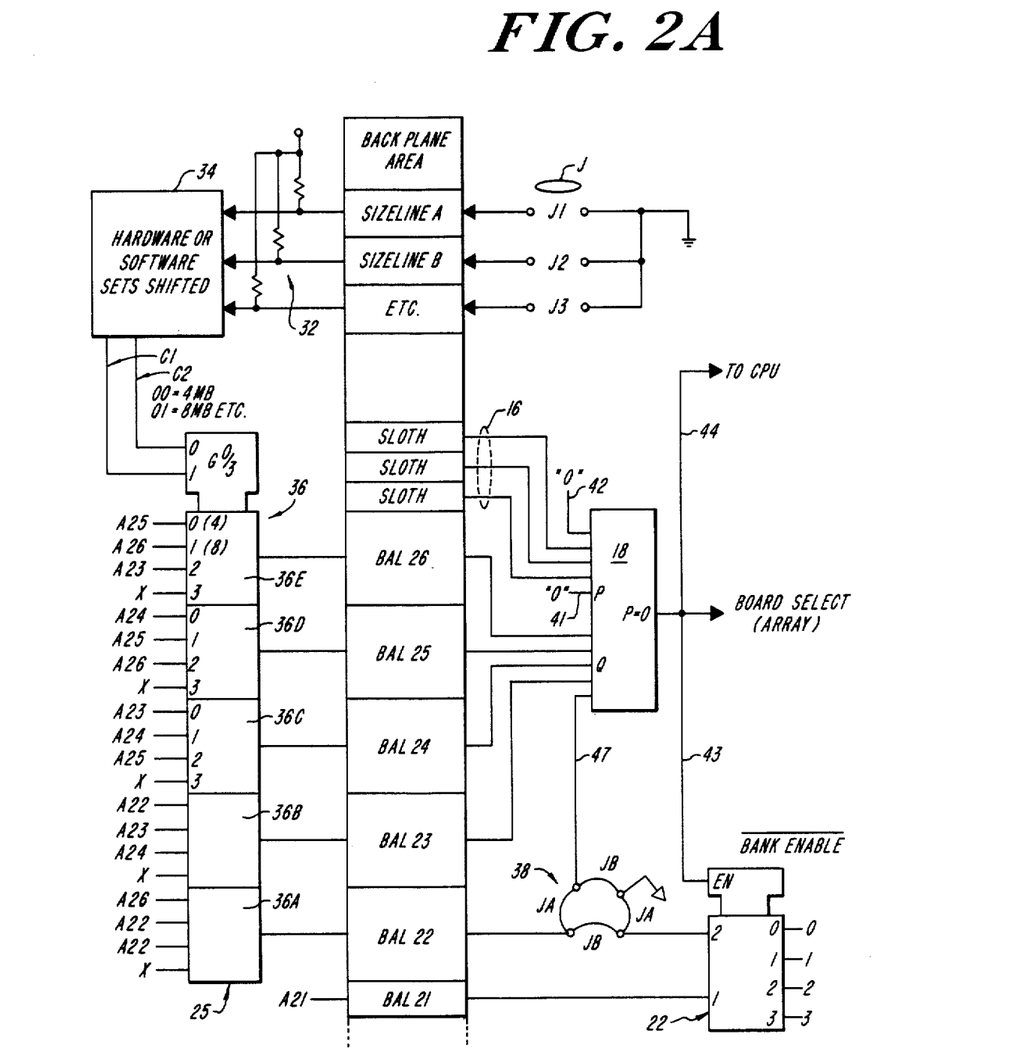
FIGS. 2A and 2B together represent a circuit block diagram of the backplane area of the memory illustrating the address shifter and memory array.
Figure 3:
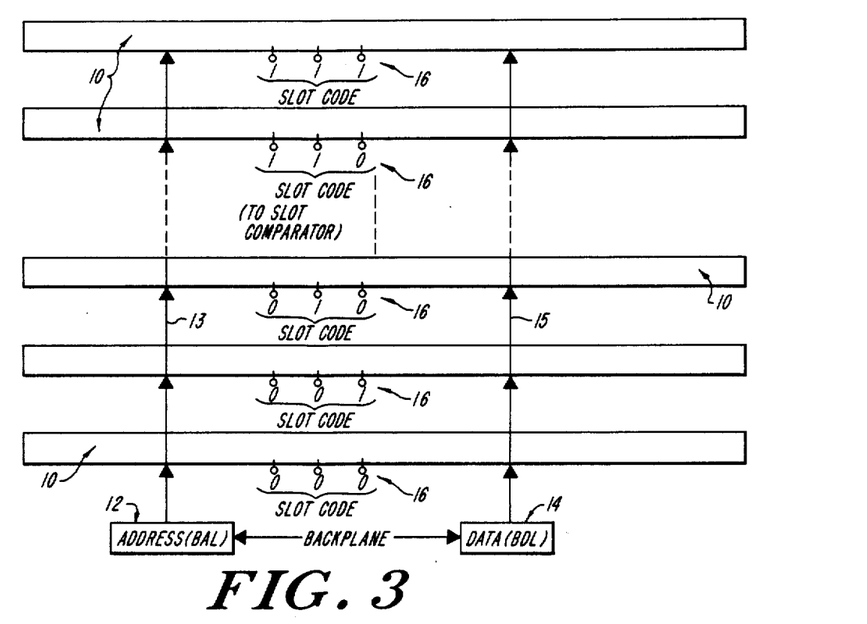
FIG. 3 is a schematic diagram illustrating the array or slot codes along with the data and addressing to each memory board.

With regard to the backplane area 28 and the memory arrays 10, reference is also now made to FIG. 3 for a schematic illustration of the memory boards 10. In the particular example of FIG. 3 there are eight memory boards identified as boards 0–7. FIG. 3 also illustrates the address bus at 12 and the data bus at 14. At the backplane area 28, the address lines as well as the data lines couple to all of the boards as schematically illustrated in FIG. 3 by the respective address and data lines 13 and 15. FIG. 3 illustrates this as a single line for the sake of simplicity. However, it is understood that the address and data lines are actually comprised of multiple bit lines so as to provide the required number of address bits and data bits. There is typically a single multi pin connector at the backplane area 28 that mates with a like connector on the memory array board. This connector has, in the embodiment disclosed herein, three terminals identified at 16 in FIG. 3 for providing a slot or array code. Because there are eight boards 3 bits are required for providing a code representative of the particular board. Upon the plugging in of a memory array board, the particular code is accessible directly at that board. Representative boards are illustrated in FIG. 3. These codes may be established in a simple manner by the use of appropriate biasing resistors and logic voltage levels. With respect to the slot or array code 16 in FIG. 3 also refer to FIG. 2A wherein the code is illustrated as coupling to a comparator 18 to be described in further detail hereinafter.

Figure 2B:
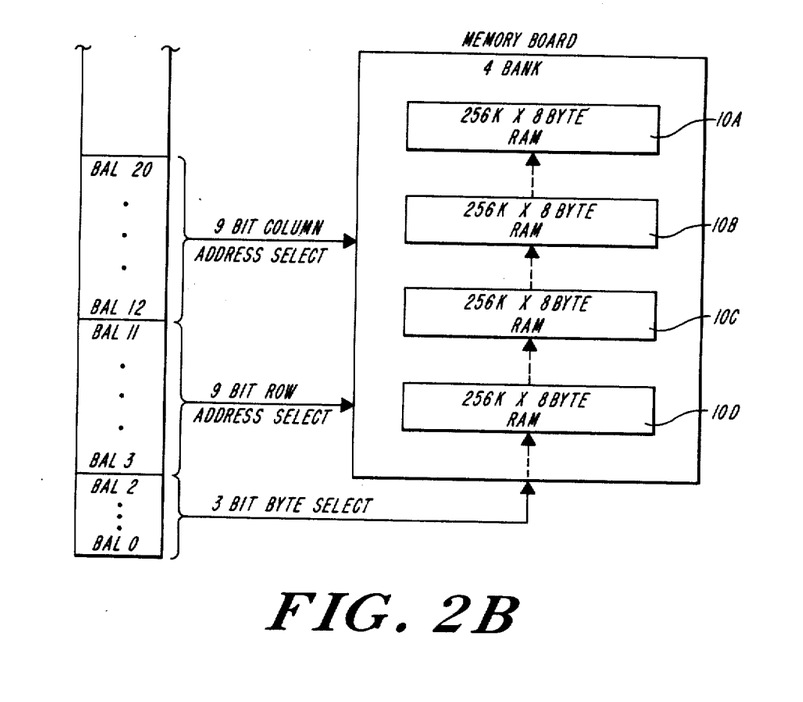

Reference is now made to FIGS. 2A and 2B for an illustration of further details of the memory arrays as well as further details of the address shifter 25 and the backplane area 28. At the backplane area 28 there is illustrated the series of address lines, referred to as bussed address lines BAL0–BAL26. FIG. 2A shows the address lines BAL21–BAL26 while FIG. 2B shows the address lines BAL0–BAL20.

In FIGS. 2A and 2B only a single memory array 10 is illustrated. However, it is understood that a plurality of such arrays, as illustrated in FIG. 1, receive their addressing signals from the backplane area 28. Furthermore, associated with each memory board is a comparator such as the comparator 18 shown in FIG. 2A as well as a bank decoder 22 as also illustrated in FIG. 2A. Thus, associated with each memory array 10 is a comparator, the output of which provides the board select signal. Also, associated with each memory array 10 is the decoder 22 that provides the decode for the particular memory array bank.

In this connection it is noted that in FIG. 2B the memory array 10 is illustrated as comprised of four separate random acccess memories referred to herein as four separate banks 10A–10D. Each of the memory banks 10A–10D provides two megabyte of storage. Each of the memory banks is a group of dynamic RAM's arranged to provide a word 8 bytes wide by 265K words. Each of these dynamic RAM's in addition to being 8 bytes wide has each byte comprised of 8 bits thus providing the total of 2 MB of storage capacity.

In a memory array built with dynamic RAM's some of the addresses are used to address the RAM's themselves. For a 256K RAM this requires 18 addresses. This is illustrated in FIG. 2B with the use of 9 addresses for column select and 9 addresses for row select. Thus, in FIG. 2B the addresses BAL0–BAL2 provide three bits of address for byte selection. This selects between the 8 bytes of each ram. Next, are the addresses BAL3–BAL11. These 9 bits are for row address selection. Next, are the addresses BAL12–BAL20. These 9 bits are for column address selection.

Figure 4:
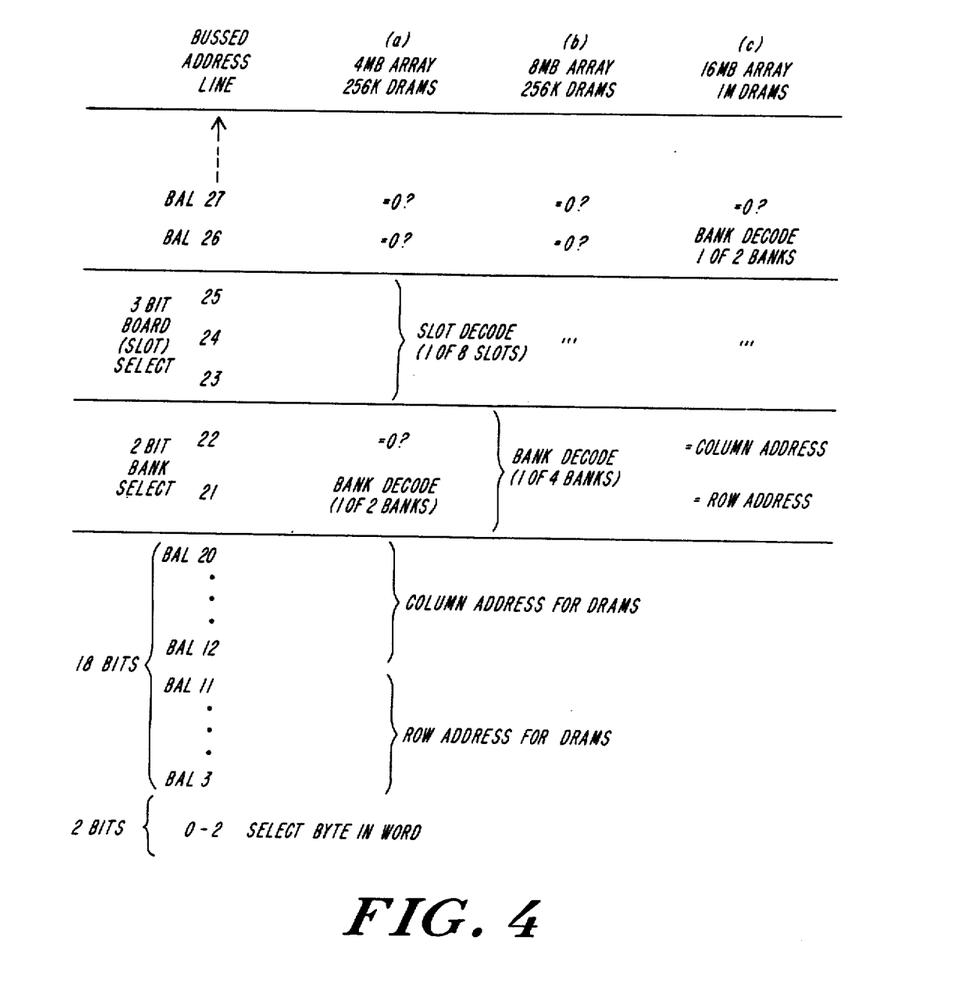
FIGS. 4 and 5 are related diagrams useful in explaining the address shifting concepts of the present invention.

With the RAM's arranged to provide a word 64 bits or 8 bytes wide, there would thus need to be two banks of RAM to obtain 4 MB storage. This would only require one address bit for bank decode. However, for an 8 MB array 2 address bits are used to decode 1 out of 4 banks assuming that the board is constructed with 256K RAM's. If a 16 MB array is used with 1 MB RAM's, this would require two more addresses for the RAM's or one for row selection and one for column selection and only one address would be required to decode 1 out of 2 banks. This scheme is illustrated in FIG. 4 for the 16 MB array. FIG. 4 also illustrates the addressing for the 4 and 8 MB arrays.

With respect to the bussed address lines of FIG. 2A and 2B, also refer to the diagram of FIG. 4. Again, FIG. 4 illustrates the addresses BAL0-BAL20 for providing byte selection along with row and column selection. This leaves the higher order addresses to decode which of the banks of memory are to be accessed on the board and to also decode which board or array to select in the backplane. For a 4 MB memory board, only one address is needed to decode 1 of 2 banks and if there is an 8 slot backplane, the next three higher addresses are compared to the binary slot or array code number to decode which array to address. This is also illustrated in FIG. 4. Note that for the 4 MB array only one address line is necessary for bank decode while for the 8 MB array, two addresses are necessary for bank decode. For the 16 MB array the bussed address lines BAL21 and BAL22 are the bits used for additional column and row addressing as illustrated in FIG. 4.

FIG. 4 also illustrates the bussed address lines BAL23, BAL24 and BAL25 as being the three bits for slot decode. This applies across the board for all capacity memory arrays. It is furthermore noted in FIG. 4 that for the 16 MB array the bussed address line BAL26 is used for the bank decode for 1 out of 2 banks. It is noted that for the 16 MB array 1 MB RAMs are used thus requiring only two banks for completing the full 16 MB capacity.

Figure 5:
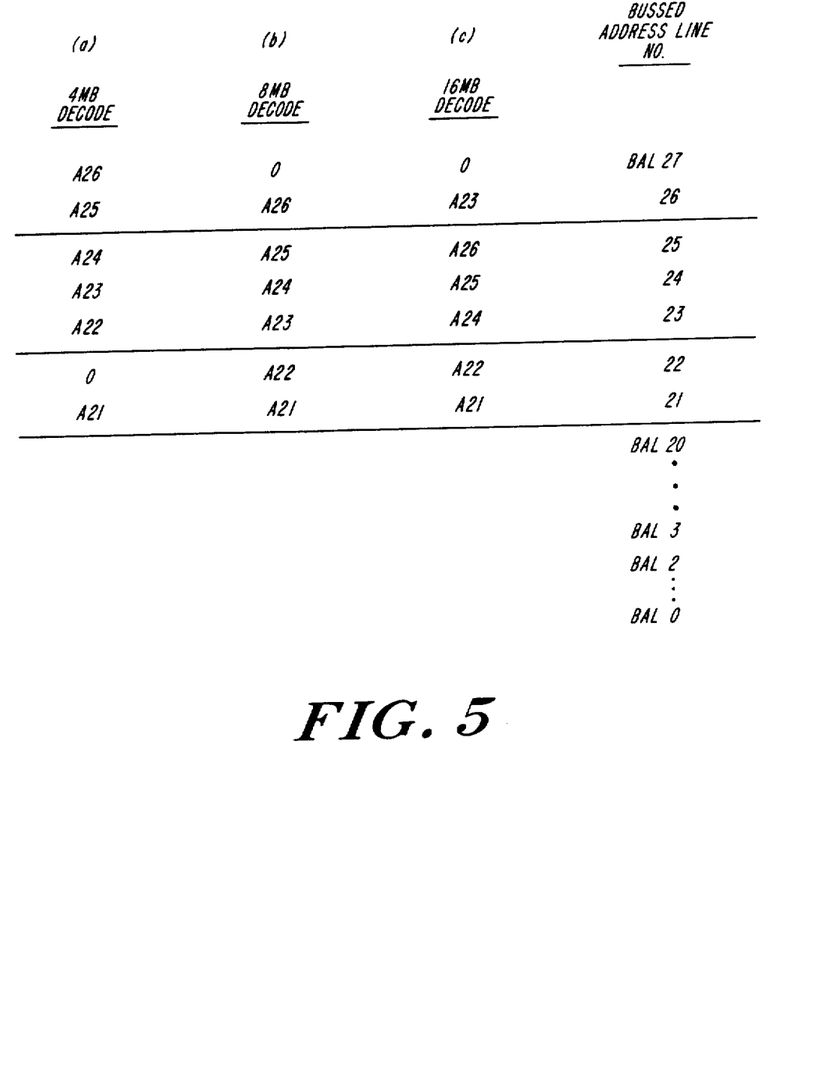

As indicated previously, the operation of the address shifter 25 is controlled in accordance with the largest capacity memory that is employed. If the largest array in the system is a 4 MB array then the memory controller presents the CPU addresses to the backplane area 28 as illustrated in FIG. 5 at column (a). The address shifter 25, however, can be controlled to change the addresses presented to the backplane address lines (BAL) to that illustrated in FIG. 5 in columns (b) and (c). These columns respectively represent the 8 MB and 16 MB decodes and give the CPU addresses presented to the backplane bussed address lines. Note in FIG. 5 that these addresses are the same as presented at the inputs to the address shifter 25.

In the manufacturing of these memory boards, the selection means is set at the time of manufacture. This is illustrated in FIG. 2A by the jumper J that may be used to bridge across the different terminals illustrated, namely terminals J1-J3 for coupling signals by way of network 32 to control hardware or software as illustrated at 34. It is noted that from the control box 34 there are two control lines C1 and C2 that couple to the address shifter. In the embodiment of FIG. 2A the address shifter 25 is implemented by a multiplexer 36 in which the control of signals passed through the multiplexer is by means of signals on lines C1 and C2. These are binary signals that may be either "1" or "0". This provides for four decoded conditions of the multiplexer 36. In this connection, refer to the following table that relates jumper placement to the signals appearing on the lines C1 and C2. The following table also provides the megabyte decode boundaries.

TABLE 1

| JUMPERS | C1 | C2 | DECODE |
|---------|----|----|--------|
| None | 0 | 0 | 4 MB |
| J1 | 0 | 1 | 8 MB |
| J2 | 1 | 0 | 16 MB |
| J3 | 1 | 1 | 32 MB |

When there is no jumper that is used then this indicates a 4 megabyte boundary decode. The use of the jumper bridging terminals J1 only indicates an 8 megabyte decode. The jumper bridging terminals J2 only indicates a 16 megabyte decode. The bridging of only the contact J3 by the jumper is set at manufacturing time once it is determined what the largest capacity of memory board is.

The multiplexer 36 in the embodiment disclosed in FIG. 2A has five segments, 36A-36E. Each of these segments has four inputs for the four different conditions imposed at the control lines C1 and C2, and has one single output. The output lines from the five segments 36A-36E couple to the backplane bussed address lines BAL22-BAL26. It is noted that CPU addresses are coupled to only three of the four inputs of each segment. Thus, in the embodiment of the multiplexer depicted in FIG. 2A this is providing for decoding of only three memory capacity decode conditions.

With regard to the multiplexer 36, reference is also now made to FIG. 5 in which there is illustrated once again the bussed address lines and in particular the higher order address lines BAL21-BAL27. FIG. 5 illustrates the manner in which the address is sent out on the bussed address lines to the arrays can be changed. Note in particular the signals coupled to the bussed address lines BAL23-BAL25. These signals are shifted depending upon whether it is a 4 megabyte decode boundary, an 8 megabyte decode boundary or a 16 megabyte decode boundary. Note that addresses A22-A24 apply for the 4 megabyte decode, addresses A23-A25 apply for the 8 megabyte decode and addresses A24-A26 apply for the 16 megabyte decode.

On the output side of the backplane area 28, it is noted that the bus address line signals from positions BAL23-BAL26 couple to one side of the comparator Q. Also, the signal from address line BAL22 couples by way of coupling means 38 to either the comparator 18 or the 2 input decoder 22. Depending upon whether one or both of the input signals to the decoder 22 are active, there can be either 2 or 4 outputs that are valid from the decoder 22 depending upon whether decoding 1 of 2 banks or 1 of 4 banks.

With respect to the coupling means 38 illustrated in FIG. 2A, it is noted that it is comprised of 2 pairs of jumpers identified in FIG. 2A as jumpers JA and jumpers JB. The jumpers JA are installed on a 4 MB board while the jumpers JB are installed in a 8 MB board. It is furthermore to be noted that although the multiplexer 36 is illustrated with three sets of inputs, the circuitry illustrated in FIG. 2A is for handling only 4 MB and 8 MB decodes. Additional logic circuitry is required but is not described in FIG. 2A in connection with the 16 MB decode. The 16 MB decode requires that the lines BAL21 and BAL22 couple to the memory board and thus additional logic is required to carry this out. This logic is not specifically set forth in FIG. 2A. However, FIG. 2A does completely describe the operation with respect to the 4 MB and 8 MB decodes.

The following is now a description of the operation particularly with respect to using all four MB arrays, alternatively, using all eight MB arrays or alternatively mixing 4 MB and 8 MB arrays.

If the memory slots are all populated with 4 MB arrays then each of the boards has the jumpers JA installed. This means that the signal from the address line BAL22 couples directly to the comparator 18. The other jumper JA grounds one of the inputs to the decoder 22 and thus the decoder 22 only responds to address signals from address line BAL21. This is the case on a 4 MB decode boundary as illustrated in FIG. 5 at column (a). For the 4 MB decode the CPU address A26 is "0" and the signal from line BAL22 is essentially compared with the 0 input to the other side of the comparator at line 41. Next into the comparator are the signals from lines BAL23–BAL25. These are the CPU ADDRESS signals A22–A24, respectively which provide the decode for the memory board or memory array. Lastly, is the signal from line BAL26 which corresponds to CPU address A25 which again is to be a 0 and is compared to line 42 at the other input to the comparator 18. The other three inputs between lines 41 and 42 to that side of the comparator are the three lines referred to previously in connection with the description of FIG. 3 and identified as the array or slot code lines 16.

When the CPU presents an address with the code that corresponds to the slot code, then there is a comparison detected at comparator 18 providing an output signal identified in FIG. 2A as the board or array select signal. This signal couples by way of line 43 to enable the bank decoder 22. The signal also can couple to additional circuitry on the memory board such as for enabling data driven out of the memory back to the CPU. Also, the output from the comparator 18 includes a signal on line 44 that is coupled back to the CPU to indicate to the CPU that for the particular address just presented, there is in fact a board selection indicating that this is in fact a valid address.

Next is the assumption that all boards are 8 MB boards. The manufacturer has thus inserted the jumper J across terminals J1 thus causing a different input to the multiplexer 36. Rather than the previous both "0" codes at lines C1 and C2 this then changes the control code to C1=0 and C2=1. This essentially then shifts the addresses to those depicted in FIG. 5 at column (b). This is now for an 8 MB decode.

For the 8 MB decode, it is noted that through the multiplexer 36 and directly at the address line BAL21, there are provided the CPU addresses A21–A26 at the corresponding bussed address lines BAL21–BAL26 respectively.

Furthermore, for each of these 8 MB boards, the JB jumpers are installed rather than the JA jumpers. This now means that the lines BAL21 and BAL22 couple directly to the two inputs to the decoder 22. This is thus providing as indicated in FIG. 4, a bank decode of 1 out of 4 banks which is the decode for an 8 MB array. Recall that the 8 MB array has 4 banks rather than 2.

The other jumper JB grounds the line 47 which is the lowest input on the Q side of the comparator 18. The address inputs to the comparator 18 for memory array decoding incude the CPU address signals A23–A25 coupled from the bussed address lines BAL23–BAL25 to the comparator 18. Also, there is the CPU address A26 coupled by way of bussed address line BAL26 to the final input of the comparator 18 on the Q side thereof.

For the 16 megabyte decode, as indicated previously, there is additional circuitry not depicted in FIG. 2A but that would be adapted to provide the signals illustrated in FIG. 5 at column (c). In this instance the address line signals BAL21 and BAL22 would couple to the memory array to provide a total of 10 column and rows select addresses. The CPU addresses A24–A26 then function as the array select signals coupling to the comparator 18. The CPU address A23 is used for bank decoding and would be coupled by logic circuitry to the bank decoder 22.

Returning now to the address shifter state in which the multiplexer 36 is controlled for an 8 MB decode, if a 4 MB array is used in the system the circuitry operates so as to check the appropriate addresses to respond to only 4 MB worth of address. In this connection, refer to FIG. 5 at column (b). However, the 4 MB board itself has the jumpers JA installed rather than the jumpers JB. Thus, for this 4 MB board, used on an 8 MB decode, the jumpers JA are installed meaning that the bank decoder 22 has only one active input from the address line BAL21. The address line BAL22 couples to the decoder 47. Because the line 41 to the P side of the comparator 18 is at a logic 0, the line 47 coupled from the line BAL22 will only provide a comparison when this line is also a logic "0". A logic "1" on line BAL22 provides no comparison at comparator 18 and thus does not generate any array or board select signal.

Thus, the CPU can send address signals on an initialization of the system to test the availability of memory spaces on a board-by-board basis. In testing this 4 MB board, any address signals coupled in which the signal on line BAL22 is a "1" will indicate that no board is selected. This signal is coupled back to the CPU by way of line 44 to indicate essentially an address failure; meaning that for this particular address tested, there is no storage available. This storage is not available because on the 8 megabyte decode there is only a 4 megabyte board installed and thus this indicates to the CPU immediately that there are holes at this address space.

In an alternate arrangement of operation, rather than signalling back to the CPU by way of line 44, the CPU can test the memory arrays by writing to an address and then reading from the same address. If the read information does not correspond to the written information then this also is an indication to the CPU that this is an unusable address. Thus, in this way the CPU can interrogate the availability of memory space.

With respect to the bank decoder 22, it is illustrated in FIG. 2A as having four outputs. However, it is understood that when only one of the inputs to the decoder is active then there is only a selection between two of the four outputs. For an 8 MB array all four lines are active so that 1 of the 4 banks can be selected such as 1 of the 4 banks 10A–10C in FIG. 2B. For a 4 MB memory array, then only two of the outputs are active selecting 1 of only 2 of the banks of the array. The bank enables signals illustrated in FIG. 2A may couple to additional memory circuitry not described herein. For example, the bank enable signals may be used at logic gates to enable memory timing signals such as the standard signals CAS and/or RAS for column and row address selection.

In a further embodiment of the invention, each of the memory arrays may comprise only a single memory bank. In that instance, the bank decoder, such as decoder 22, shown in FIG. 2A of the present application is not needed.

Having now described one embodiment of the present invention, it should now be apparent to those skilled in the art that numerous other embodiments and modifications thereof are contemplated as falling within the scope of the present invention as defined by the appended claims.

What is claimed is:

1. A memory control system for controlling addressing of memory arrays in a computer system which can accept memory arrays of various storage capacity, each memory array including multiple array banks, said memory arrays coupled to a memory backplane area of said computer system having a plurality of connectors corresponding to said plurality of memory arrays, and said memory backplane coupled to an input address bus through said memory control system, said memory control system comprising; address shifter means including multiplexer means having a plurality of segments, each segment coupled to receive a plurality of input address lines of said input address bus and having an address output, said multiplexer means having a control input, means for establishing a control signal determined by the largest memory array in the backplane, means for decoupling the address output of each multiplexer means segment to a corresponding backplane connector, said multiplexer means placing at said address output of each segment said plurality of input address lines of said input address bus in accordance with said control signal such that proper memory addressing is established.

2. A memory control system as set forth in claim 1 wherein said backplane connectors accommodate arrays of at least four megabyte and eight megabyte capacity.

3. A memory control system as set forth in claim 2 wherein said memory arrays comprise both four megabyte and eight megabyte arrays and wherein said control signal to the multiplexer means corresponds to a largest memory array of eight megabytes.

4. A memory control system as set forth in claim 3 wherein the control signal causes a shift in address signals by at least one address position when changing control from a four megabyte decode to an eight megabyte decode.

5. A memory control system as set forth in claim 4 wherein the backplane has a backplane address bus including at least one address bit for bank decode and three address bits for array decode.

6. A memory control system as set forth in claim 5 wherein each array bank has multiple word locations, each word location comprising multiple bytes.

7. A memory control system as set forth in claim 6 wherein the backplane address bus also includes address bits for word decode and address bits for byte decode.

8. A memory control system as set forth in claim 1 wherein the control signal to the multiplexer means causes a shift in address signals by at least one address position when changing control from one largest capacity memory array to a different largest capacity memory array.

9. A memory control system as set forth in claim 1 wherein said means for establishing a control signal includes selection means at said memory backplane.

10. A memory control system as set forth in claim 9 wherein said means for controlling the multiplexer means in accordance with the selection means includes means for providing a binary control signal to said multiplexer means.

11. A memory control system as set forth in claim 10 wherein the binary control signal has two control bits for providing up to four different address selections by the multiplexer up to four different address selections by the multiplexer means.

12. A memory control system as set forth in claim 11 wherein said selection means includes jumper means.

13. A memory control system as set forth in claim 12 wherein the backplane area has means defining a predetermined slot code for identifying each particular memory array.

14. A memory control system as set forth in claim 13 including comparator means associated with each memory array and having first and second address inputs to be compared and means coupling the slot code to the first address inputs of the comparator means and means coupling backplane area address signals to the second address inputs of the comparator means, said comparator means providing an output array select signal upon equal comparison.

15. A memory control system as set forth in claim 14 wherein said input address bus couples from a processing unit, and further including means for coupling the array select signal to the processing means to monitor said signal.

16. A memory control system as set forth in claim 15 further including a bank decoder for receiving at least one backplane area address signal to provide an output bank select signal.

17. A memory control system as set forth in claim 16 wherein the bank decoder has the capability of decoding two backplane area address signals.

18. A memory control system as set forth in claim 17 further including coupling means having one position for coupling a predetermined address signal to said bank decoder and another position for coupling said predetermined address signal to said comparator means.

19. A memory control system as set forth in claim 18 wherein said coupling means includes jumper means.

20. A system for controlling the addressing of a memory on a predetermined multi-megabyte decode boundary, said system including a processing means having a processor address bus comprising a plurality of address lines, a backplane area having a backplane area address bus, also having a plurality of address lines, said memory comprising a plurality of memory arrays, means coupling the memory arrays to the backplane area address bus, memory address controller means, and means coupling said memory address controller means for shifting address signals between said processor address bus and backplane area address bus, said memory address controller means comprising, address shifter means for shifting address signals having input terminals coupled to said address lines of said processor address bus and output terminals coupled to said backplane area address bus and further having a control input, means for establishing a control signal determined by the memory array of largest capacity of all memory arrays, said control signal having different states to control said address shifter means to couple different address line patterns therethrough to said backplane area address bus as a function of the selected control signal state.

21. A system as set forth in claim 20 wherein said address line patterns to said backplane area address bus comprise higher order address lines as the capacity of the largest capacity array increases.

22. A system as set forth in claim 21 wherein the array memory capacity may be one of N megabyte and 2N megabyte.

23. A system as set forth in claim 22 wherein said address line patterns to said backplane area address bus shift upwardly by one address line as the largest capacity memory increase from N megabytes to 2N megabytes.

24. A system as set forth in claim 20 wherein said address shifter means comprises a multiplexer means.

25. A system as set forth in claim 24 further including means defining a predetermined array code for identifying each particular memory array and comparator means for comparing the array identifying code with the backplane area address lines, said backplane area address lines indicating the array containing the accessed address and outputting an array select signal if a match is detected.

26. A system as set forth in claim 25 further including a bank decoder for receiving at least one backplane area address signal to provide an output bank select signal.

27. A system as set forth in claim 26 further including coupling means having one position for coupling a predetermined address signal to said bank decoder and another position for coupling said predetermined address signal to said comparator means.

28. A system as set forth in claim 27 wherein said coupling means includes jumper means.

29. A method of controlling the addressing of a memory on a predetermined multi-megabyte decode boundary in which the memory is sectioned into a plurality of memory arrays, said method comprising the steps of, providing a backplane area with an address bus having a plurality of address lines, coupling said memory arrays to said address lines of said backplane area, providing a processing means having a processor address bus comprising a plurality of address lines which are coupled to said backplane, establishing a control signal determined by the memory array of largest capacity of all memory arrays, and shifting the coupling of the address lines from the processor address bus to the backplane area address bus under control of said control signal so as to couple different address patterns to the backplane area address bus as a function of the largest capacity memory array.

30. A method as set forth in claim 29 wherein the address bits shift to higher order address bits as the capacity of the largest capacity array increases.

31. A method as set forth in claim 29 further providing a predetermined array code for identifying each particular memory array and comparing the array identifying code with the backplane area address bits to provide an output array select signal.

32. A method as set forth in claim 31 further decoding at least one backplane area address signal to provide an output bank select signal.

* * * * *